Figure 1:
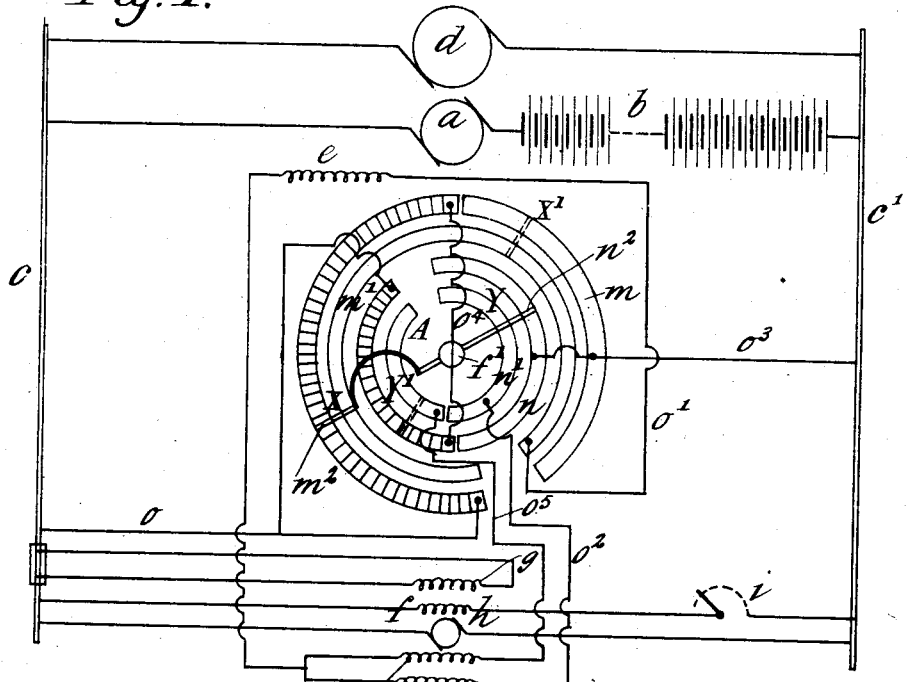

No. 871,537. PATENTED NOV. 19, 1907.
M. J. E. TILNEY.
VOLTAGE REGULATOR.
APPLICATION FILED OCT. 17, 1905.

3 SHEETS—SHEET 1.

WITNESSES
R. A. Balderson
W. W. Swartz

INVENTOR
Max J. E. Tilney
by Bakewell & Byrnes
his Attys

No. 871,537. PATENTED NOV. 19, 1907.
M. J. E. TILNEY.
VOLTAGE REGULATOR.
APPLICATION FILED OCT. 17, 1905.
3 SHEETS—SHEET 2.
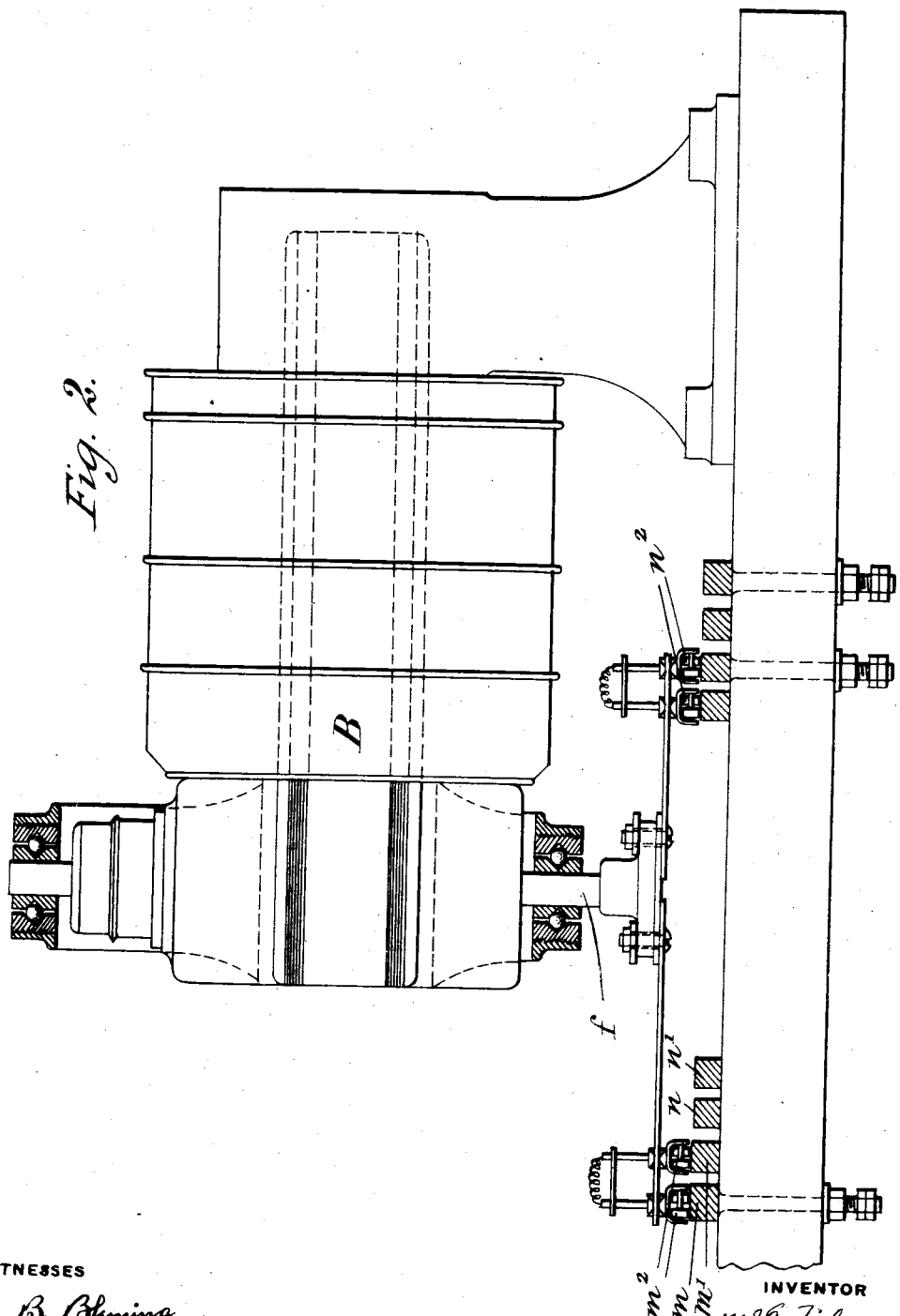
WITNESSES
INVENTOR No. 871,537. PATENTED NOV. 19, 1907.
M. J. E. TILNEY.
VOLTAGE REGULATOR.
APPLICATION FILED OCT. 17, 1905.

3 SHEETS—SHEET 3.

WITNESSES
INVENTOR

UNITED STATES PATENT OFFICE.

MAX JAMES ECCLES TILNEY, OF SOUTH KENSINGTON, ENGLAND.

VOLTAGE-REGULATOR.

No. 871,537.  Specification of Letters Patent.  Patented Nov. 19, 1907.

Application filed October 17, 1905. Serial No. 283,100.

*To all whom it may concern:*

Be it known that I, MAX JAMES ECCLES TILNEY, a subject of the King of Great Britain, residing at 8 Astwood road, South Kensington, in the county of London, England, electrical engineer, have invented certain new and useful Voltage-Regulators, of which the following is a specification.

This invention relates to a method of automatically regulating the voltage in electric light and power circuits with varying loads, and is applicable even to circuits in which the load varies suddenly and by large amounts.

The method consists substantially in varying the excitation of the machine to be controlled by means of a rheostat in series with the shunt winding of the field and controlled by a motor driven switch. The motor field is differentially wound according to a particular scheme, having three coils: (1) a coil in series with the work circuit or carrying a definite proportion of the circuit load, (2) a coil shunting the load circuit and proportioned to give a definite armature flux at the standard voltage, and (3) a coil carrying a current which varies in direction and strength with the exciting current of the machine to be controlled or the potential at its terminals.

The series and shunt coils are wound to oppose each other, while the third coil is divided into two sections, one of which is arranged to produce a flux in opposition to coil 2, the shunt coil, when the machine to be controlled is giving an E. M. F. in the normal direction, while the other section, or both sections, is, or are, arranged to produce a flux opposed to coil 1 when the machine to be controlled is giving an E. M. F. in the reverse direction. It has been found preferable in practice to cut out the first section of coil 3 on reversing, the turns in the second section being correspondingly increased. This arrangement is in fact practically necessary when a regulator is used in parallel with the first section so as to divert current therefrom and thus obtain higher current values in the field coil of the machine to be regulated without correspondingly increasing the flux due to the first section of coil 3.

The invention is herein illustrated as applied to shunt wound boosters used for charging and discharging batteries of accumulators on electric light and power circuits with fluctuating loads.

Figure 4:
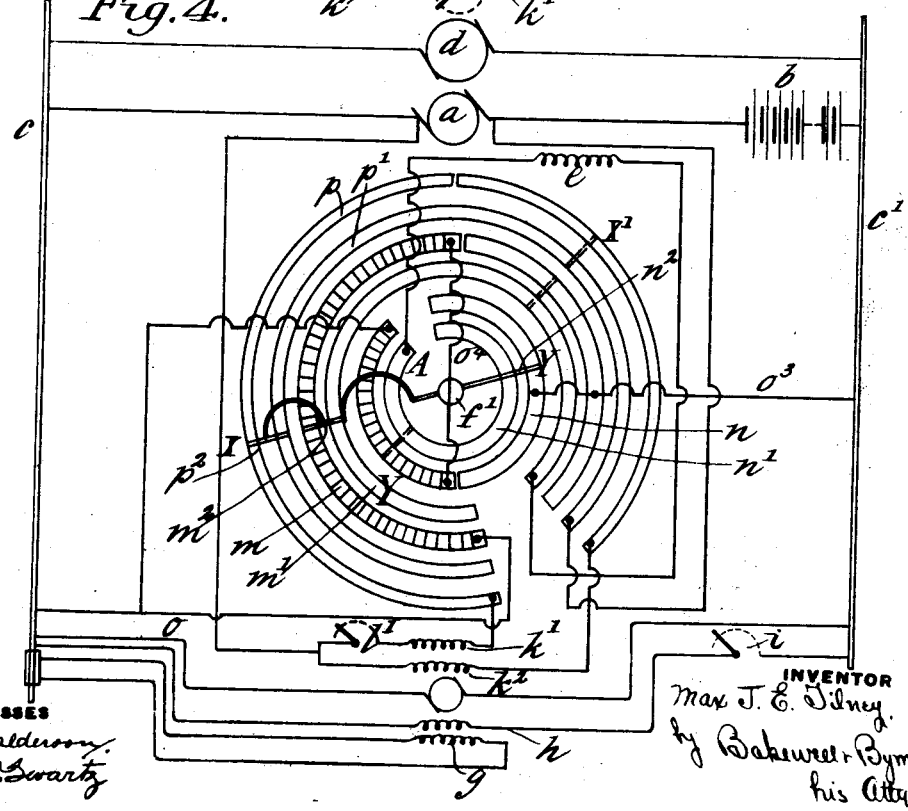
Figure 3:
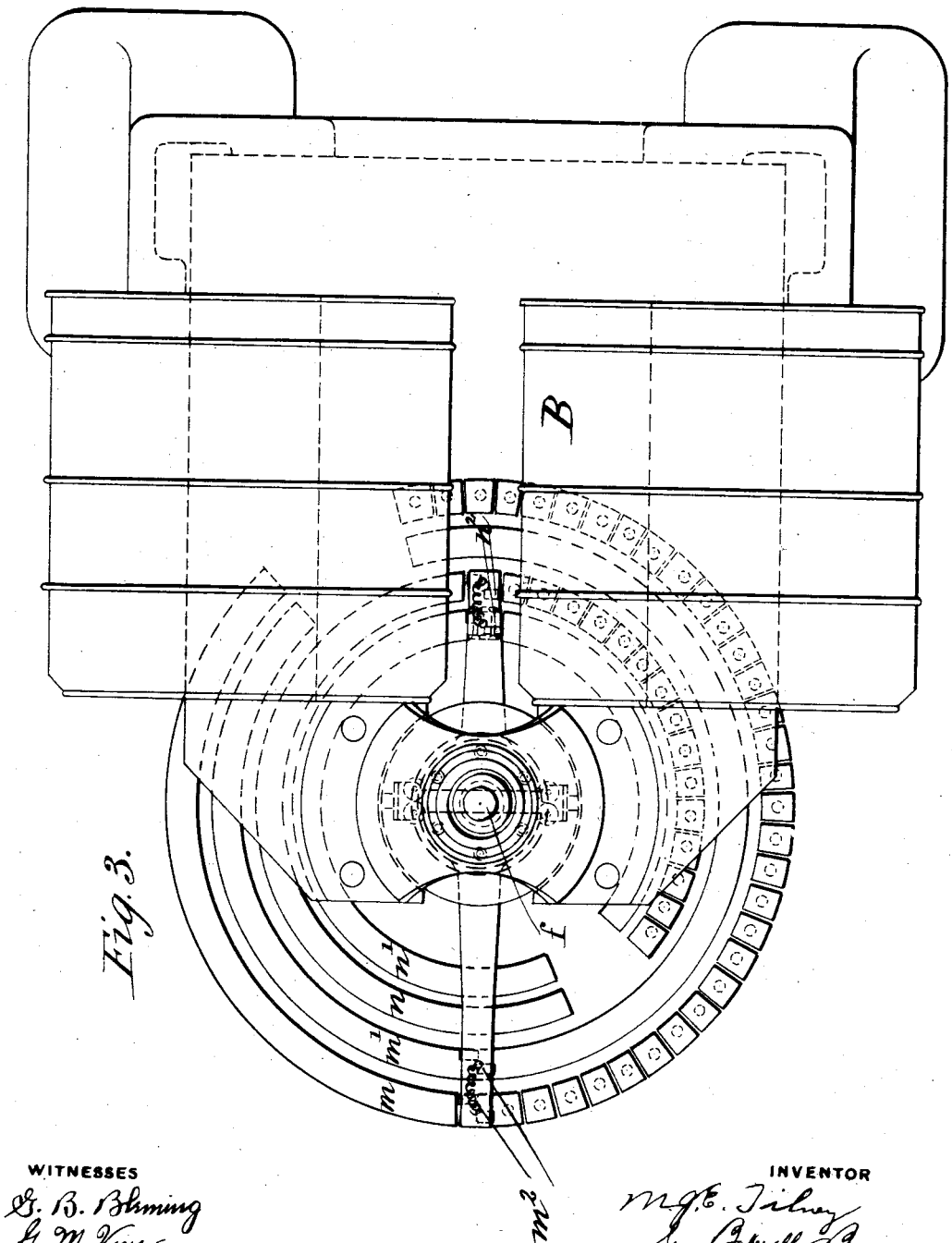

In the accompanying drawings Figure 1 illustrates diagrammatically the method of regulation which constitutes the present invention, while Figs. 2 and 3 are respectively an elevation partly in section and a plan view of one arrangement of the motor driven switch used in carrying out the invention; and Fig. 4 is a view similar to Fig. 1 showing the modifications involved when the third exciting coil of the regulator motor is connected across the terminals of the machine to be regulated.

Referring to these drawings, the machine to be regulated is a reversible booster $a$ connected in series with a storage battery $b$ across the supply leads $c$ $c'$, on the load side of the main generator $d$. The field coil $e$ of the booster is connected in series with a regulator A across the supply leads, this regulator being operated and controlled to vary the field current of the booster and consequently its E. M. F. in accordance with the load on the circuit so that when the load exceeds the normal the booster will assist the discharge of the battery to a greater or less degree thus relieving the main generator of part of the load and when the load is less than normal the booster will charge the battery.

The regulator is actuated by a suitable motor B the armature $f$ of which is supplied with an approximately constant current, as by connecting it across the supply leads. The motor field is excited by three distinct coils or sets of coils, one of which $g$, carries a current proportional to the load on the circuit; a second $h$, is wound to oppose the action of coil $g$ and is connected across the supply leads, being adjusted as by means of a rheostat $i$ to produce a definite magnetic flux at the standard or normal load voltage of the circuit; while the third, which consists of two sections $k'$ $k^2$, carries a current which varies in direction and strength with the current in the field coil $e$ of the booster $a$ (Fig. 1) or with the potential at its terminals (Fig. 4). Of these two sections $k'$ is operative when the booster current is in what may be called the normal direction, that is when the battery is being charged and is then producing a flux which assists that due to coil $g$, but when the booster current is in the reverse direction $k'$ is cut out and $k^2$ becomes operative, producing a flux which assists that due to coil $h$, the change being effected by the switch of the regulator A as hereinafter described. Further, when the resultant magnetic flux due to the three sets of coils of the regulator motor field is not *nil* and there is a consequent movement of the motor armature, the resultant movement of the regulator alters the resistance controlled thereby so as to produce a magnetic balance as between the three sets of coils and the motor and regulator come to rest. In the arrangement of Fig. 1, the change of flux due to the third set of coils is directly effected by the change of the regulator resistance which is in series both with the booster field coils $e$ and with the coils $k'$ $k^2$ of the regulator motor, while in the arrangement of Fig. 4 the change of magnetic flux due to coil $k'$ or $k^2$ follows the change of booster potential produced by the alteration of the regulator resistance which in this case is in series with the booster field coils only.

It is evident that when the resultant field of the motor is *nil*, a change of load on the circuit will produce a change of flux due to coil $g$ and consequently a movement of the regulator in one direction or the other, and the arrangement is such that an increase of the circuit load, when the battery is charging and coil $k'$ operative and assisting coil $g$, causes a movement of the regulator switch which decreases the current in the booster field coils and consequently also the booster E. M. F. and the current in coil $k'$, until the magnetic equilibrium of the motor field is again established. Similarly, under the same conditions, a diminution of the circuit load will increase the booster E. M. F. and also the current in coil $k'$, until the magnetic equilibrium is again established. Also, when the booster is assisting the discharge of the battery and coil $k^2$ is operative and assisting coil $h$, an increase in the circuit load and consequent increase in the flux due to coil $g$ is arranged to effect a movement of the regulator which will increase the booster E. M. F. and also the flux due to coil $k^2$, and conversely.

In the intermediate position, that is to say when the circuit load is normal and the battery neither charging nor discharging, the coils $g$ and $h$ balance each other and the regulator switch is in a position in which the maximum resistance, which may be infinite, is included in the field circuit of the booster. The current in the coil $k'$ is regulated either by means of a diverter $l$ shunting the coil (Fig. 1), which enables higher values of current in the field coils $e$ to be obtained without increasing the flux due to coil $k'$, or in the arrangement in which the coil $k'$ is connected across the booster terminals (Fig. 4) a series regulator $l'$ may be substituted.
A convenient form of regulator A is shown in diagram in Fig. 1, and in more detail associated with the driving motor B in Figs. 2 and 3. This consists of two pairs of metal rings or strips, of which the outer pair $m$ $m'$ are arranged to be bridged by the contact rollers $m^2$, and the inner pair $n$ $n'$ by the contact rollers $n^2$, these contact rollers being carried by insulated diametrical arms which revolve with the armature $f'$ of the driving motor. These pairs of contact rings are not continuous but are interrupted as shown at points diametrically opposite to each other, and further one of each pair, viz. $m'$, $n'$, are plain strips, of which $n'$ is interrupted also at another point as shown, while the other strips $m$ $n$ consist partly of plain strips and partly of contact blocks between which the regulator resistances are connected, the two parts being insulated from each other. The end blocks are electrically connected with each other and the plain parts of the strips $m$ $n$ are electrically connected with one of the mains. The other electrical connections will be described by tracing the current circuits for various positions of the roller contacts.

Assuming the rollers to be in the position indicated by the full lines X, Y, a position in which the battery is being charged, a circuit is completed from the lead $c$ through wire $o$, resistances of rheostat strip $m$, contact rollers $m^2$, strip $m'$, wire $o'$, field coil $e$ from right to left, coil $k'$, wire $o^2$, right hand part of strip $n'$ contact rollers $n^2$, and wire $o^3$, to lead $c'$. As the load increases and consequently the flux due to coil $g$, the armature $f$ rotates so as to restore the magnetic equilibrium that is so as to reduce the flux due to coil $k'$, the contact rollers moving clockwise and increasing the resistances of $m$ included in the booster field circuit until the contact rollers $m^2$ pass on to the plain part of strip $m$, the contact rollers $n^2$ passing simultaneously to the rheostat part of the strip $n$.

When the rollers are in the position shown by the dotted lines X', Y', a circuit is completed from lead $c$, through resistances of rheostat strip $n$, contact rollers $n^2$, left hand part of strip $n'$, wire $o^5$, coil $k^2$, field coil $e$ from left to right, wire $o'$, strip $m'$, rollers $m^2$, strip $m$ and wire $o^3$ to lead $c'$. In this case the booster E. M. F. is reversed and the booster is assisting the discharge of the battery. As the load on the circuit decreases, the flux due to coil $g$ will decrease and to restore equilibrium the armature $f$ will rotate to reduce the field due to coil $k^2$ which is opposing coil $g$, thereby increasing the resistances of rheostat $n$ included in the booster field circuit, and reducing the booster E. M. F., until finally it becomes zero when the contact rollers $m^2$ $n^2$ are moved on to the gaps in the pairs of strips $m$ $m'$, $n$ $n'$ respectively.

In the modified arrangement of Fig. 4, the regulator has an additional pair of strips $p$ $p'$ divided as shown and arranged to be bridged by an additional pair of contact rollers $p^2$, these strips being electrically connected as shown in the diagram with the coils $k'$ $k^2$ and the booster terminals.

It will be obvious that when the contact rollers are in a charging position as shown by the lines X, Y, the booster exciting current will be in the same direction as in the case of the apparatus of Fig. 1, and the coil $k'$ will be connected across the booster terminals, and when the rollers are in the position shown by the dotted lines X′ Y′, the booster field current will be reversed, and the coil $k^2$ will be connected across the booster terminals.

It will be understood that when the method of regulation herein described is applied to the main generating machine or machines on a circuit the provision for reversal of the field current is dispensed with.

Having thus described the nature of this invention and the best means I know of carrying the same into practical effect, I claim:—

1. In the regulation of electric circuits having varying loads, a dynamo-electric machine and an automatic regulator controlling the field of the said machine and actuated by a motor having three field coils which normally neutralize each other and are so related with each other and the circuit that an increase or decrease of the circuit load produces a movement of the regulator which correspondingly varies the voltage of the dynamo electric machine, and at the same time restores the equilibrium of the motor field; substantially as described.

2. In the regulation of electric circuits having varying loads, an automatic regulator actuated by a motor having three sets of field coils, one set carrying a definite proportion of the circuit load, a second set wound to oppose the first and carrying a current proportional to the circuit voltage, and the third set carrying a current determined by the position of the regulator; substantially as described.

3. In the regulation of electric circuits having varying loads, a dynamo electric machine, a regulator, a motor actuating said regulator, said motor having a field magnet system comprising three sets of coils, one set connected to carry a definite proportion of the circuit load, a second set wound to oppose the first and connected across the circuit to be regulated, and the third set connected to opposite sides of the dynamo-electric machine; substantially as described.

4. In the regulating of electric circuits having varying loads, a dynamo-electric machine connected with the circuit, a regulator controlling the field of said machine, a motor actuating said regulator, said motor having a field magnet system comprising three sets of coils, one set connected to carry a definite proportion of the circuit load, a second set wound to oppose the first set and connected across the circuit to be regulated, and the third set carrying a current which varies in direction and magnitude with the voltage of the dynamo-electric machine; substantially as described.

5. In the regulating of electric circuits having varying loads, a dynamo-electric machine connected across the circuit, a regulator controlling the field of said machine, a motor actuating said regulator, said motor having a field magnet system comprising three sets of coils, one set carrying a definite proportion of the circuit load, a second set wound to oppose the first and connected across the load circuit, and a third set wound in two sections, one adapted to assist and the other to oppose the first set of field coils, said sections being alternatively connected to opposite sides of the dynamo-electric machine by the regulator; substantially as described.

6. In the regulation of electric circuits having varying loads, a dynamo-electric machine connected across the circuit, a regulator controlling the field of said machine, a motor actuating said regulator, said motor having a field magnet system comprising three sets of coils, one set carrying a definite proportion of the circuit load, a second set wound to oppose the first, and connected across the load circuit, and a third set wound in two sections, one adapted to assist and the other to oppose the first set of field coils, said sections being arranged to be alternatively connected by the regulator in series with the field coils of the dynamo-electric machine; substantially as described.

7. In the regulation of electric circuits having varying loads, a reversible booster and storage battery connected across the circuit to be regulated, a regulator controlling the field of the booster, a motor actuating said regulator, said motor having three sets of field coils, one set carrying a definite proportion of the circuit load, a second set wound to oppose the first and carrying a current proportional to the circuit voltage, and a third set wound in two sections, one adapted to assist and the other to oppose the first winding, said sections being alternatively connected to opposite sides of the booster by the regulator; substantially as described.

8. In the regulation of electric circuits having varying loads, a reversible booster and storage battery connected across the circuit to be regulated, a regulator controlling the field of the booster, a motor actuating said regulator, said motor having three sets of field coils, one set carrying a definite proportion of the circuit load, a second set wound to oppose the first and carrying a current proportional to the circuit voltage, and a third set in series with the booster field; substantially as described.

9. In the regulation of electric circuits having varying loads, a reversible booster and storage battery connected across the circuit to be regulated, a regulator controlling the field of the booster, a motor actuating said regulator, said motor having three sets of field coils, one set carrying a proportion of the circuit load, a second set wound to oppose the first and connected across the load circuit, and a third set wound in two sections, one adapted to assist and the other to oppose the first winding, said sections being arranged to be alternatively connected by the regulator in series with the booster field; substantially as described.

In testimony whereof I have signed my name to this specification in the presence of two subscribing witnesses.

MAX JAMES ECCLES TILNEY.

Witnesses:
JOSEPH MILLARD,
T. J. OSMAN.